Feb. 1, 1955  H. W. GRONEMEYER  2,700,909
CONTINUOUS METHOD AND APPARATUS FOR MAKING GRINDING BALLS
Filed Sept. 12, 1950   6 Sheets-Sheet 3
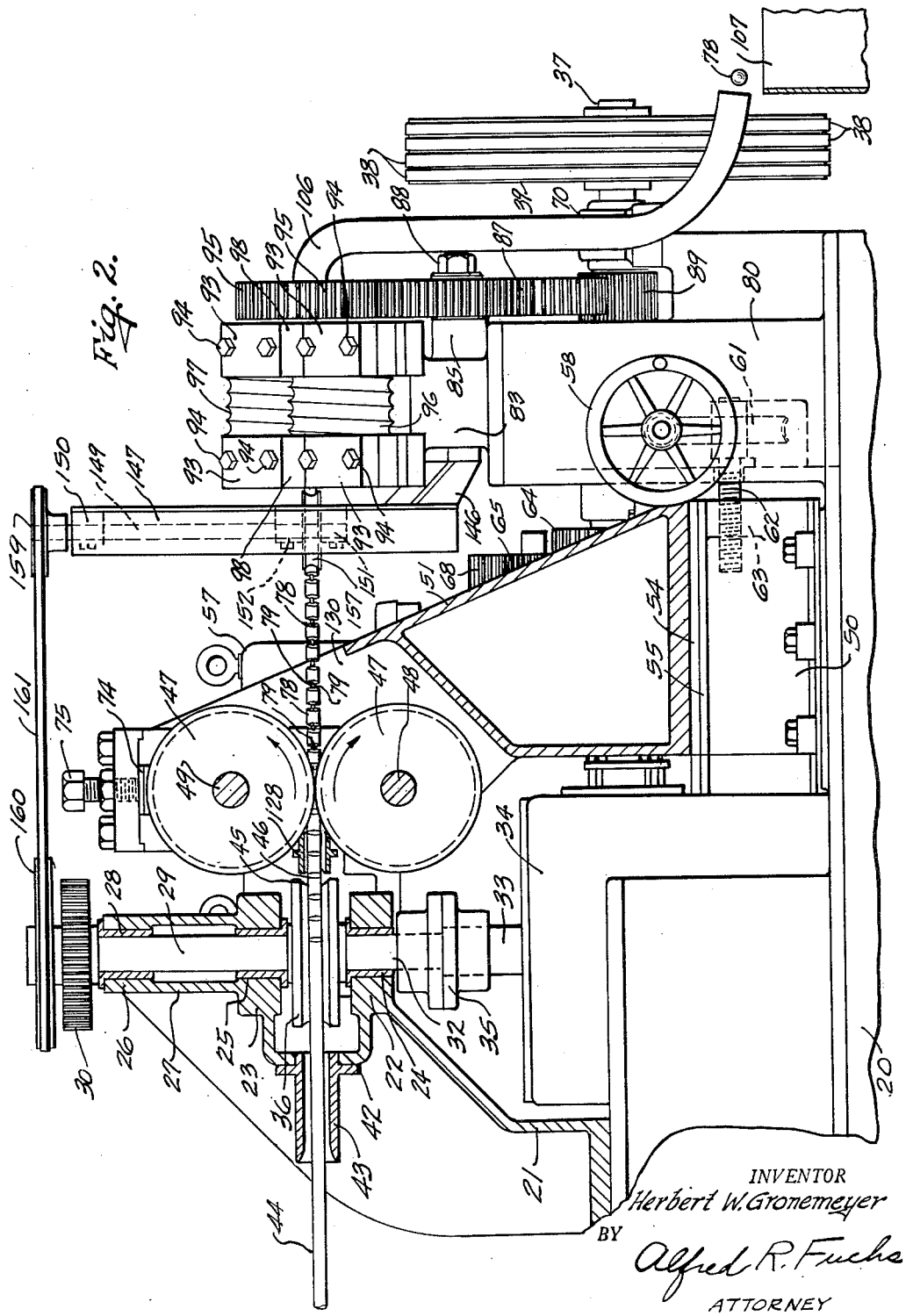
INVENTOR
*Herbert W. Gronemeyer*
BY
*Alfred R. Fuchs*
ATTORNEY Feb. 1, 1955  H. W. GRONEMEYER  2,700,909
CONTINUOUS METHOD AND APPARATUS FOR MAKING GRINDING BALLS
Filed Sept. 12, 1950  6 Sheets-Sheet 4

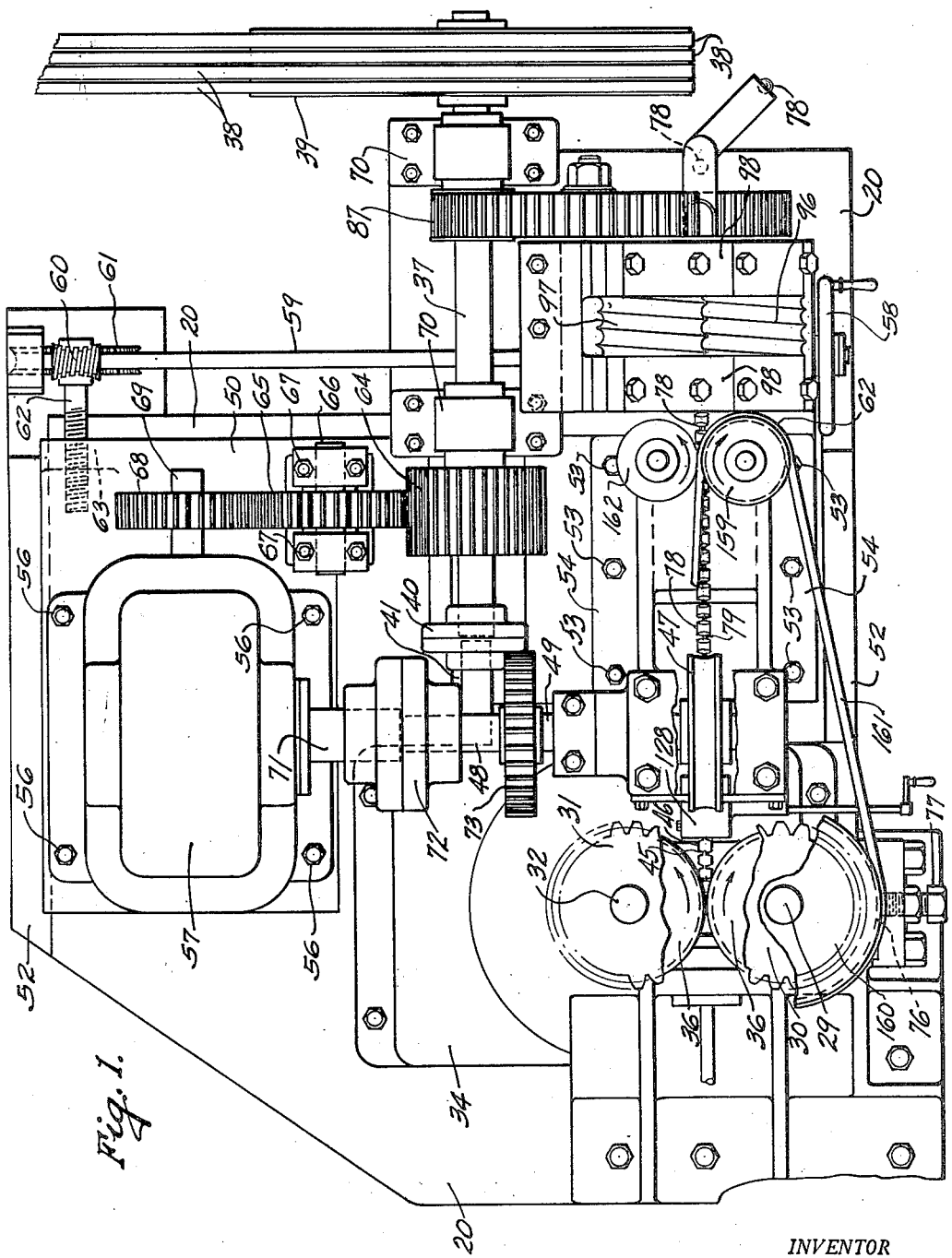

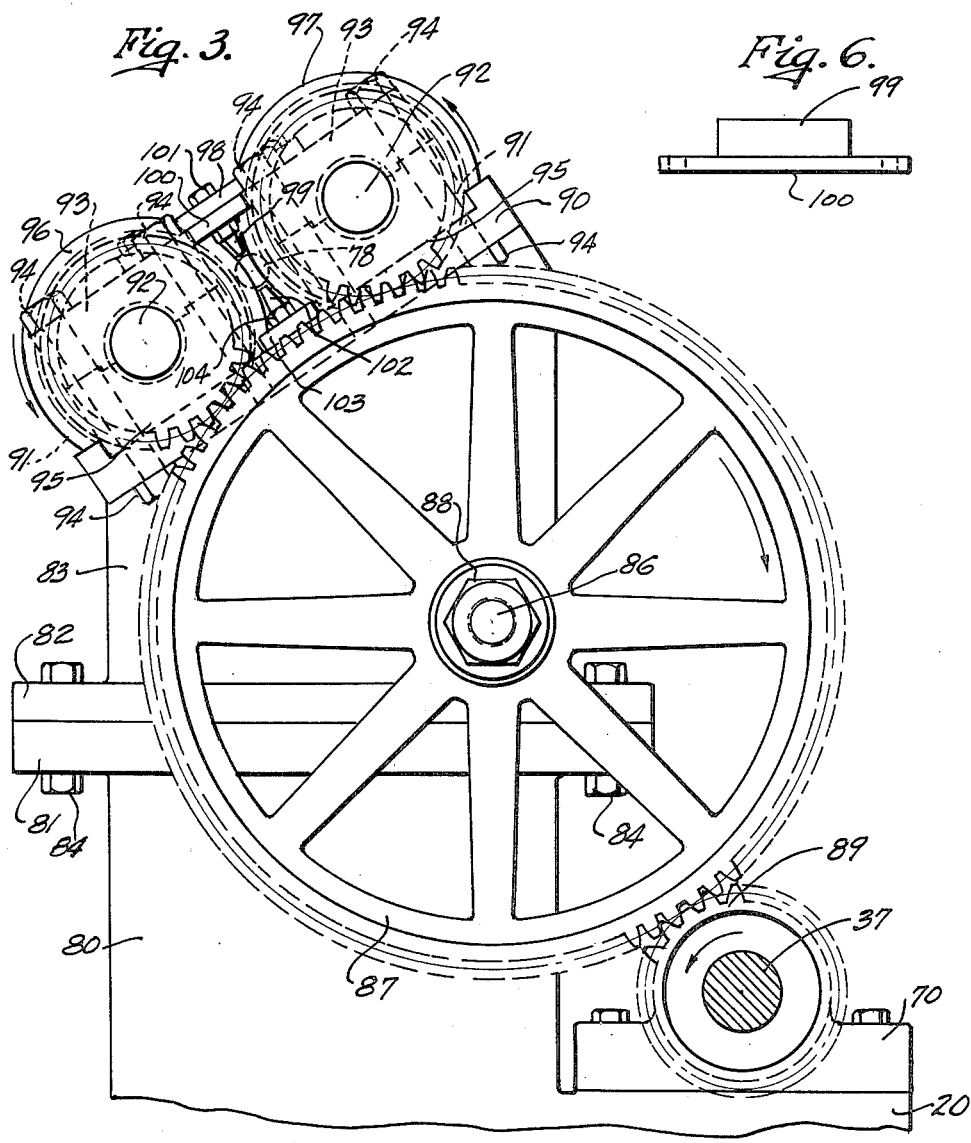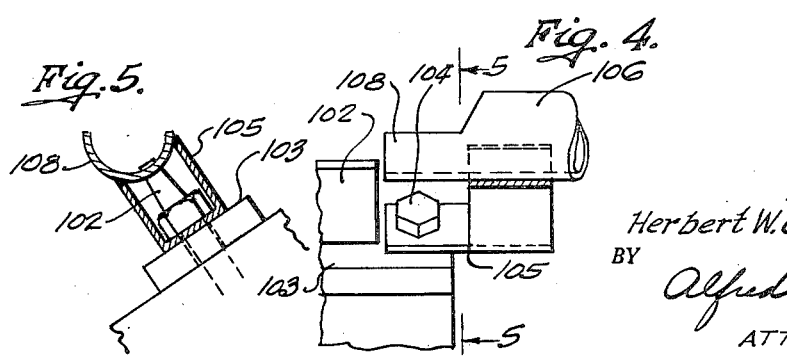

INVENTOR
Herbert W. Gronemeyer
BY Alfred R. Fuchs
ATTORNEY

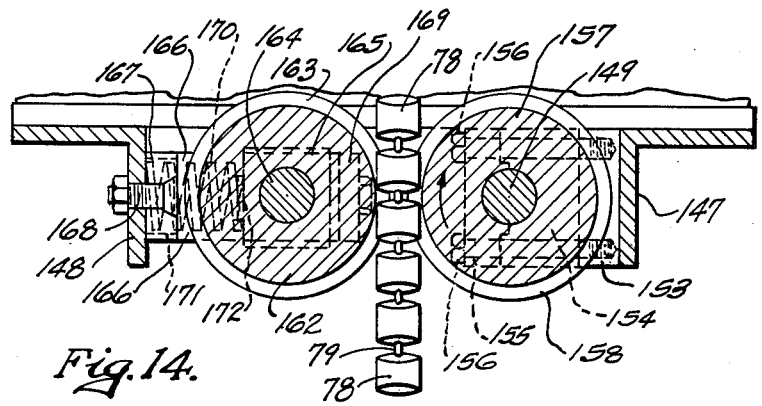

United States Patent Office 2,700,909
Patented Feb. 1, 1955

2,700,909

CONTINUOUS METHOD AND APPARATUS FOR MAKING GRINDING BALLS

Herbert W. Gronemeyer, Kansas City, Mo., assignor to Armco Steel Corporation, a corporation of Ohio Application September 12, 1950, Serial No. 184,384

16 Claims. (Cl. 80—23)

My invention relates to a method and apparatus for making steel balls, and more particularly to a continuous method and apparatus for making grinding balls.

In the manufacture of grinding balls it is important that the cost of production thereof be kept to a minimum and that the balls have as long a life in their use in the ball mill as possible, in order that the use of such balls in grinding operations will be as economical as possible.

In order that steel grinding balls can be produced rapidly in the most economical and efficient manner, it is desirable to make the same from a steel shape, such as a rod, by a continuous method, involving the forming of the balls from the rod in a connected series and the separation of the balls of the series from each other, without halting the progress of the rod, which usually is supplied in coils of great length, through the forming apparatus.

In order that such a method can be carried out in the most practical and efficient manner, it is necessary to avoid all reciprocating motions of any machine parts that are involved in the forming of the ball-like or spherical formations from the rod and the separation of these into separate balls or units. Unless all such reciprocating movements of the mechanism are avoided, no great gain in speed of operation of ball rolling apparatus will result over that in which forging of the individual balls is done by cutting off lengths of rod and then forging the individual ball from such a cut off blank by a reciprocating die, which is the common method of producing grinding balls at the present time.

While it is desirable to avoid any reciprocating mechanisms in the apparatus for making grinding balls, it is also highly important that the apparatus utilized for avoiding such reciprocating motions is not too extremely expensive. Attempts have been made to make grinding balls between a pair of rolls having spiral grooves of gradually changing pitch and depth that gradually form ball formations on a round rod and are intended to eventually separate these ball formations into individual balls. However, as various sizes of balls have to be produced in practice, and as the rolls that are used for rolling such objects as grinding balls wear out after a certain amount of use and have to be replaced, the use of such spirally grooved rolls, even if these would successfully produce grinding balls, is so great that the cost of the grinding balls produced thereby is increased to such an extent that this is not practical.

It is the principal purpose of my invention to provide a new and improved method and apparatus for making grinding balls, in which the grinding balls are made from a continuous length of rod, the rod being hot rolled to produce a series of ball formations that are connected by narrow neck portions, and are separated at said neck portions to provide separate ball formations, without involving any spirally grooved forming rolls and without providing any reciprocating movements of any part of the apparatus, all the moving parts rotating continuously in the same direction, which makes it possible to greatly increase the speed of production of grinding balls from rods, or similar steel shapes, without unduly increasing the cost of the apparatus for carrying out the method.

My improved method more specifically comprises hot rolling closely spaced ball formations connected by narrow neck portions on a steel rod and while the ball formations and the connected neck portions are still in the heated condition, exerting combined shear and torsion on said neck portions to separate the ball formations from each other.

The ball formations connected by narrow neck portions are formed in two rolling steps, the first of which comprises swaging the rod at regularly spaced intervals to provide a series of slugs that are separated by swages or transverse indentations in the rods, and then swaging or rolling said rod by means of rolls that act on the rod at points 90° around the same from the rolls that first formed the swages therein, to provide the ball formations connected by means of the narrow neck portions, which are also short, so that the ball formations are closely adjacent each other.

This method of forming the connected ball formations is disclosed in my application, Serial No. 431,874, filed May 24, 1954, which is a continuation of my application, Serial No. 58,933, filed November 8, 1948, and now abandoned, on Continuous Method and Apparatus for Forming Balls. However, in the method and apparatus disclosed in said co-pending application, the separation of the grinding balls is accomplished by a cutting or sawing operation, which necessitates the mounting of the cutting or sawing means so that it has an oscillating or reciprocating motion, which limits the possible speed of operation of the machine. By my improved method herein disclosed, this reciprocating or oscillating motion with its limitation on the speed of operation of the machine is entirely eliminated.

This is accomplished by providing for the separation of the closely adjacent ball formations, at said narrow neck portions, by exerting combined shear and torsion on said narrow neck portions. The apparatus for producing this combined torsional and shearing action involves only rotating parts, which can be geared to the swaging rolls in such a manner that the separating means and the rolling means will operate at a predetermined speed relative to each other to produce uniform results in the production of grinding balls. The combined torsion and shearing action is obtained by providing a pair of spirally grooved rolls, between which the connected ball formations pass after leaving the forming rolls, the grooves gradually changing in depth from a shallow to a deep portion and back again to said shallow portion in the course of two convolutions. Furthermore said spirally grooved rolls are so arranged that the groove in the one roll is deepening gradually as the groove in the roll opposite the same is gradually becoming more shallow at the same rate. Accordingly the space defined between the two grooves of the two cooperating rolls is always substantially a circular one of the same size as one of the ball formations, located in the cooperating grooved portions of the rolls that are adjacent each other at any one time.

Due to the manner in which the grooves of the separating rolls are formed, the ball formations that are connected by the narrow neck portions will be rotated by the separating rolls constantly about different axes and the adjacent ball formations lying on opposite sides of one of the narrow neck portions will be rotated about different axes through the major portion of the time that such rotation is taking place, the axes about which the adjacent ball formations rotate lying first on one side of the dividing line between the two rolls and then on the other side thereof.

Due to the fact that a shallow groove portion of one roll lies adjacent a deep groove portion of the same roll, and the deep groove portion of one roll lies opposite a shallow groove portion of the cooperating roll, and vice versa, the ball formations will not only be rotating about different axes, but at different speeds about their respective axes at the same time. Thus the variation in depth of the grooves will cause both torsion and shear to be exerted on the narrow neck portions that connect the ball formations, causing the separation of said ball formations by this combined shear and torsion. Also due to the fact that the axis of rotation of the balls is constantly being changed, because of the difference in surface speed of the different portions of the grooves, the surface speed of the shallow portions being somewhat greater than that of the deep groove portions, the small projection that remains from severing the narrow neck portions is rolled by the grooved rolls so as to be incorporated in the spherical body of the ball, thus eliminating any slight projection that might have existed due to the twisting off of the connection between adjacent ball formations. Any zone that may remain in the ball formations after the second swaging operation that is not compoundly curved will also be rolled into spherical form due to the action of the separating rolls.

One of the important features of my invention is the provision of means for preventing any rotation of the swaged rod about its axis after leaving the first set of swaging rolls and before entering the second set of swaging rolls to assure that the second swaging action will take place at a point 90° around the rod from said first swaging action.

It is an important feature of my invention that the swaging rolls serve as feeding means for the connected ball formations toward the separating rolls, and that said separating rolls are provided with means for conveying the connected ball formations away from the swaging rolls, thus positively feeding the same to the separating rolls immediately after the same are formed. The connected ball formations are separated immediately after forming the same on the rod while still in a sufficiently plastic condition that said separating rolls will not only sever the connecting narrow neck portions, but will aid in shaping the ball by serving as perfecting means to remove any projections therefrom that might result from the severed neck portions and roll into spherical shape any cylindrically curved portion of the rod that may remain after the swaging operations have been completed.

If it is desired to still further perfect the spherical shape of the balls, said balls may be passed from the separating mechanism into a sizing machine that completes the rounding of the contour thereof, such as the sizing machine disclosed in the patent to Brandt and Bockting, on Ball Rolling Machine, No. 2,178,222, patented October 31, 1939.

Other objects and advantages of my invention will appear as the description of the drawings proceeds. I desire to have it understood, however, that I do not intend to limit myself to the particular details shown or described, except as defined in the claims.

In the drawings:

Fig. 1 is a plan view of my improved ball forming machine, partly broken away.

Fig. 2 is a view thereof partly in side elevation, partly in vertical section and partly broken away.

Fig. 3 is a fragmentary end view of the ball separating means as viewed from the discharge end thereof, the ball discharging tube being omitted.

Fig. 4 is a fragmentary elevational detail view, on a somewhat larger scale, of the lower ball guiding means for the separating rolls and discharge tube.

Fig. 5 is a section taken on the line 5—5 of Fig. 4.

Fig. 6 is a side elevation of one of the ball guiding members detached.

Fig. 14 is a fragmentary plan view of the separating mechanism feed rolls on an enlarged scale.

Fig. 15 is a plan view of the guiding means for preventing rotation of the swaged rod on its axis, and Fig. 16 is an end elevation thereof, showing the swaged rod in section.

Figure 7:
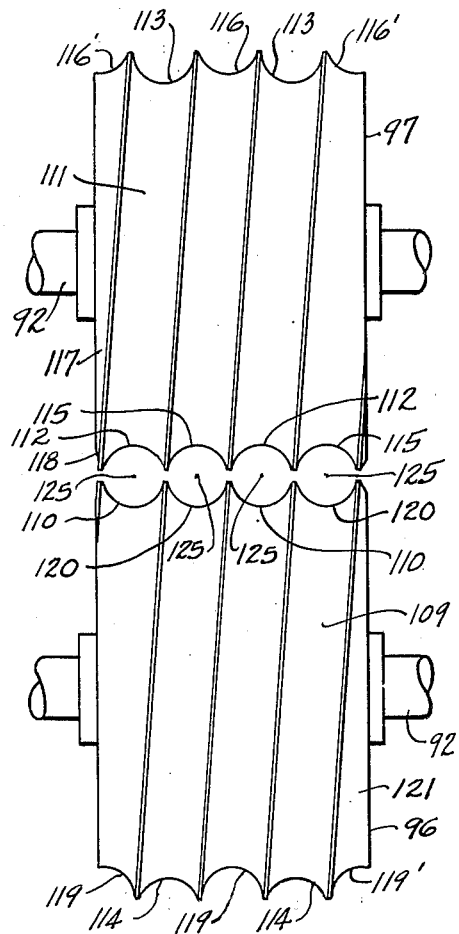
Fig. 7 is a fragmentary view in elevation of the cooperating separating rolls in one position thereof.

Referring in detail to the drawings, my improved ball forming apparatus is provided with a base 20 upon which an upstanding frame portion 21 is mounted in fixed position. The frame 21 is provided with a pair of bearing portions 22 and 23, in which the bearing sleeves 24 and 25 are mounted, and a bearing portion 26 connected with the bearing 23 by a tubular portion 27, and in which a bearing sleeve 28 is mounted. A shaft 29 is mounted in the bearings thus provided, and a gear 30 is fixed on said shaft to rotate therewith. A gear 31 mounted on the shaft 32, which is similarly mounted in the upstanding frame portion 21 to the shaft 29, meshes with the gear 30. Said shaft is connected with the output shaft 33 of a reduction gearing 34 by means of a flexible coupling 35.

Mounted on the shafts 29 and 32 are the swaging rolls 36, the same rotating in the direction indicated by the arrows thereon in Fig. 1 and cooperating to form transverse swages in a rod-like member. The rolls 36 are driven from the shaft 37, which shaft is driven by means of the plurality of belts 38 operating over the pulley 39 fixed on said shaft 37 and driven in any suitable manner, as by means of an electric motor (not shown). Said shaft 37 is connected by means of a flexible coupling 40 with the input shaft 41 of the reduction gearing 34.

The frame 21 is provided with a suitable mounting 42 for a guide tube 43 for the rod 44 from which the balls are formed. Said rod is heated in any suitable manner as it is fed into the guide tube 43 and the rolls 36 cooperate to form the swages 45, which separate the ball forming portions 46 of the rod from each other, the swaged rod passing immediately to another pair of cooperating swaging rolls 47, which are rotated in the direction indicated by the arrows thereon in a manner to be described below. The rolls 47 are mounted to rotate with the shafts 48 and 49. It is necessary that the rolls 47 be adjustable toward and away from the rolls 36 in order that the ball forming dies on the rolls 47 will properly cooperate with the ball forming sections 46 of the rod 44 after having been swaged.

An adjustable frame 50 is provided for this purpose, which has an upstanding portion 51 provided with bearings for the shafts 48 and 49. The frame 50 is mounted between suitable guides 52 in the base member 20, and the upstanding frame portion 51 is secured to the movable frame 50 near one side thereof by means of securing elements 53 that clamp the flanges 54 on said upstanding frame portion to suitable flanges 55 on the movable frame member 50. Also fastened to the movable frame member 50 by means of bolts 56 is the reduction gearing 57. The frame 50 is adjustable in any suitable manner on the base 20, but is preferably adjusted by means of a hand wheel 58, which is adapted to rotate the shaft 59 that has a pair of worms 60 mounted thereon that mesh with the worm wheels 61 that are fixed on the screw shafts 62 that have screw-threaded engagement with suitable screw-threaded openings in thickened wall portions 63 in said movable frame 50. It will be obvious that the frame 50 can be moved to any adjusted position by means of the hand wheel 58 and will remain in such position after adjustment thereof.

Mounted on the shaft 37 is a wide faced gear 64, which meshes with a gear 65 mounted on a stub shaft 66, which is mounted in bearings 67 on the movable frame member 50, the gear 65 meshing in turn with a gear 68 fixed on the input shaft 69 of the reduction gearing 57. The shaft 37 is mounted in bearings 70, that are fixed on the base member 20, and thus the wide faced gear 64 is mounted in a fixed position relative to the base 20. However, the width of the gear 64 is such that as the movable frame member 50 is adjusted to its various positions, the gear 65 will always mesh with the gear 64.

The output shaft 71 of the reduction gearing 57 is connected with the shaft 48 by means of a flexible coupling 72. The shaft 49 is driven from the shaft 48 by means of gears 73 mounted on said shafts 48 and 49 that cooperate in a similar manner to the gears 30 and 31. The shaft 48 is mounted in fixed bearings on the frame 51. Similarly the shaft 32 is mounted in fixed bearings on the upstanding frame portion 21. However, the shaft 49 is mounted for adjustment toward and away from the shaft 48, the adjustable mounting being indicated generally at 74, and adjustment being made by means of the adjusting screw 75. In a similar manner the shaft 29 is provided with adjusting means 76, adjusted by means of an adjusting screw 77. Thus the relative position of the gears 30 and 31 and the gears 73, as well as the rolls 36 and 47, can be varied in accordance with the adjustment of the screws 75 and 77, while the position of the rolls 47 relative to the rolls 36 can be adjusted by means of the hand wheel 38.

Ordinarily, while the length of rod is in engagement with both pairs of rolls, that is, with the two rolls 36 and the two rolls 47, the rod is prevented from rotating about its longitudinal axis, but after the end of a length of rod, which may be rather a long length if it is being fed from a coil, passes through the rolls 36 so as to be no longer in engagement therewith, there is a tendency for the swaged rod to rotate about its longitudinal axis. If any such rotation takes place it will interfere with the proper formation of the ball formations on the rod because the second set of rolls 47 will not engage the rod at points 90° around the rod from the first set of rolls 36. In order to prevent such rotation, means is provided that is engageable with the swaged rod to prevent its rotation about its longitudinal axis, said means being located between the two sets of rolls 36 and 47.

The means for preventing such rotation is indicated generally by the numeral 128 in Figs. 1 and 2, and is shown more in detail in Figs. 15 and 16. Said rotation preventing means for the swaged rod is mounted on a pair of plates 129, which are bolted onto the upwardly extending portions 130 on the upstanding frame 51. A box-like housing 131 is fixed to the plate-like members 129, being mounted between the same so that said plate-like members 129 form wing-like brackets extending from side faces of the box-like housing 131. A pair of guide members 132 and 133 are mounted within the passage through said box-like member 131, said box-like member having a substantially rectangular passage running lengthwise therethrough so that the guide members 132 and 133 are slidable toward and away from each other in the housing, as will be obvious from Fig. 16. The guide member 132 is secured in adjusted position by means of screw-threaded fastening elements 134, the adjustment being obtained by means of shims 135 inserted between the wall of the housing 131 and the rear face of the guide member 132. Said guide member has a longitudinally extending channel or groove 136 therein that is curved in cross section, but is not as deep as it is tall, as will be obvious from Fig. 16.

The guide member 133 is provided with a similar groove 137 and is adjustable by means of a crank 138 mounted on a shaft 139 that has a threaded portion 140 that engages in an internally threaded sleeve 141 that is fixed to the housing 131 and one of the plate-like members by welding. The shaft 139 having the threaded portion 140 is rotatably mounted on the guide member 133, but the guide member 133 is held against movement lengthwise or axially of the screw-threaded shaft 139. This may be accomplished in any desired manner, as by means of a key plate 142 secured to the member 133, as by means of the fastening elements 143, having a pair of legs 144 entering the annular groove 145 in the shaft 139.

One of the slugs 46 is shown as being in engagement with the guide members. However, the guide member 133 is not shown as being in its guiding position. In order to guide the swaged rod by engagement with the enlarged portion 46 on said rod, it is necessary that the guide 133 be brought into much closer engagement with the enlargement 46 on the rod. It will be noted that the portion 46 of the swaged rod is of greater vertical than horizontal dimension. This occurs due to the swaging action exerted thereon by the rolls 36, which tend to somewhat deform the rod even between the swages so that it is not truly circular in cross section. The rod, however, must not move out of this position with its greatest thickness extending vertically in order that the swaging rolls 47 will properly engage therewith. Accordingly, the operator of the machine can adjust the guide 133 so that it will be in proper guiding position with the portion 46 of the swaged rod seated in the groove 137 therein any time sufficiently before the end of the length of rod is approaching the rolls 47 that said guide 133 in cooperation with the guide 132 will prevent any rotation of the swaged rod about its longitudinal axis. This may be done any time after the swaged rod has passed into engagement with the second set of rolls 47.

After the swaged rod passes between the rolls 47 the rod has been made into a series of connected ball formations 78 connected by narrow neck portions 79. It will be noted that said ball formations 78 are not truly spherical, but approach a spherical form, having a small portion thereof remaining of a somewhat rectilinearly curved character. Means is provided for separating the ball formations 78 and forming these into a substantially true spherical form, incorporating the narrow neck portions 79 in the ball formations, so that the entire rod that entered the dies is made into separate balls.

The means for separating and completing the spherical contour of the balls is mounted on an upstanding frame portion 80, which is mounted in fixed position on the base member 20, and which has a flange 81 thereon with which a flange 82 of an upper frame portion 83 cooperates for mounting the upper frame portion 83 on the upstanding frame portion 80 by means of fastening elements 84. The upper frame portion 83 is provided with a suitable bearing 85 for a shaft 86, upon which a large gear wheel 87 is mounted, said gear 87 being fixed to the shaft by means of a nut 88, which has threaded engagement with the shaft. The gear 87 meshes with a gear 89 mounted on the shaft 37, and said gear 87 is thus driven at a speed that is related to the rate of rotation of the rolls 36 and 47, as will be obvious.

The upper frame portion 83 has a bearing supporting member 90 mounted thereon, in which the lower bearing members 91 for the shafts 92 are mounted, upper bearing members 93 cooperating with the bearing members 92, and suitable securing means 94 being provided for securing the bearing members 91 and 93 together and to the supporting member 90. The shafts 92 have gears 95 fixed thereto, the gears 95 meshing with the gear 87. Said shafts also have rolls 96 and 97 mounted thereon, which will be described more in detail below.

Brackets 98 are mounted between the upper bearing members 93 and have a guide member 99 mounted thereon in a suitable manner. The guide member 99 is shown as having a base portion 100, which is secured to the brackets 98 by suitable securing elements 101. A similar guide member 102 is provided with a base portion 103 that is secured to the bearing mounting member 90 by suitable securing elements 104. The base member 103 of the guide 102 may have a bracket 105 secured thereto by one of the securing elements 104, said bracket supporting a guide tube 106 for carrying the separate balls away from the machine to any suitable receptacle 107, or other suitable means, such as the hopper of a sizing machine. Preferably the entrance end of the guide tube 106 is cut away to provide a trough portion 108 thereon to which the balls pass from the lower guide member 102. The guide members 99 and 102 are the same in construction, except for the mounting of the bracket 105 on the base portion of the lower guide member 102.

The rolls 96 and 97 are each provided with a spiral groove that is concave in cross section. The rolls 96 and 97 are rotated in the direction indicated by the arrows in Figs. 3, 7, 8, 9, 10, 11, 12 and 13, and the gears 87 and 89 rotate in the direction indicated by the arrows thereon.

Referring to Fig. 7 it will be noted that the groove 109 in the roll 96 has a semi-circular cross section at the point 110 where it is in cooperative relation with the groove 111 in the roll 97, and that the groove 111 is also semi-circular in cross section at the point 112 opposite the point 110 on the roll 96. At a point 113, which lies 180° around the roll 97 from the point 112 in the groove 111 in the direction of rotation of the roll 97, the groove 111 is concavely curved, but is considerably deeper than at 112, as will be obvious from Fig. 7, the depth of the groove 111 gradually increasing from the point 112 to the point 113.

Figure 8:
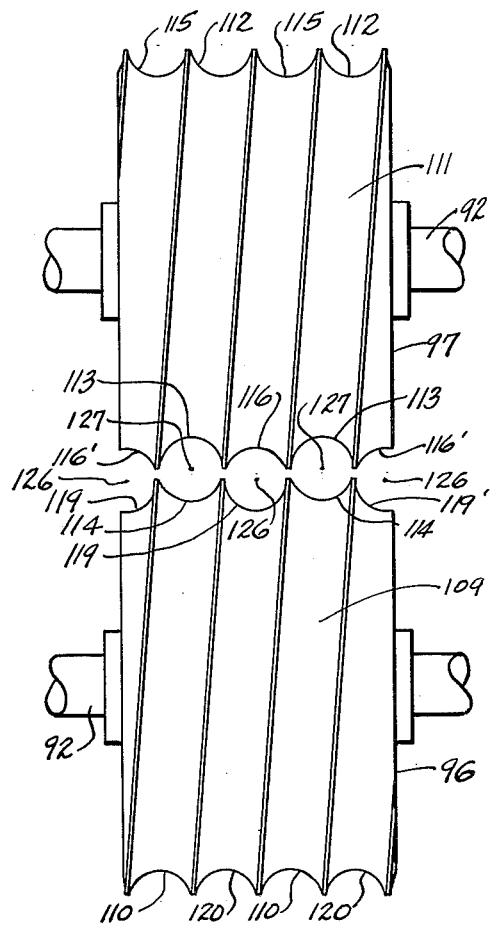
Fig. 8 is a similar view, showing said separating rolls rotated 180° from the position shown in Fig. 7.

In Fig. 8 the roll 97 is shown as having been turned through an arc of 180° so that the point 112 on the groove 111 will be remote from the cooperating roll 96, but the point 113 thereon will be in cooperative relation with a corresponding groove portion of the roll 96 to act on a ball formation in a manner to be described below. The roll 96 has also been turned through an arc of 180° in the same direction, in Fig. 8, and the portion 110 of the groove 109 in the roll 96 will be remote from the roll 97, while a shallow portion 114 of the groove 109 will be opposite and in cooperative relation with the deep portion 113 of the groove 111. In one turn of the spiral groove 111 the groove gradually increases in depth from the portion 112 thereof that is semi-circular in cross section to the portion 113 thereof, which is deeper than semi-circular in cross section, and then decreases again gradually in depth until it again is substantially semi-circular in cross section, as indicated at 115. The decrease in cross section of the groove 111 continues gradually until a point diametrically opposite the point 115 is reached, which is indicated at 116, which is the portion of minimum depth of the groove 111. Then the depth of the groove again increases gradually until another point 112 thereon, semi-circular in cross section, is reached.

Thus in two turns of the spiral groove 111 it gradually increases to a maximum and then gradually decreases to a minimum, the point of maximum depth and the point of minimum depth being one complete turn of the spiral apart. Thus the bottoms of axially adjacent groove portions are different distances from the axis of the shaft 92, the maximum difference being at the points 113 and 116, there being a difference in distance from the axis of rotation of the bottoms of the adjacent turns of the groove except at the points 112 and 115. The change in depth of the groove continues through another maximum depth point 113 and another semi-circular in cross section point 115 to the end of the groove, a part of the cross section of the groove still existing at the shallow part 116' shown in Fig. 7. The entrance portion 117 of the groove also has a shallow portion 116', the groove gradually decreasing in depth from the entrance end 118 thereof to the point 116', the entrance end 118 being curved on the arc of a circle transversely, as will be obvious from Fig. 7.

The groove 109 is similarly formed, having the deep point 119, from which the groove gradually decreases in depth to the semi-circular in cross section point 110 and continues gradually decreasing in depth to the shallow portion 114, and then gradually increases in depth from the shallow portion 114 to the semi-circular in cross section portion 120 and continues this gradual increase in depth to the next deep portion 119, again then decreasing in depth through the portion 110 to the shallow point 114 and from said shallow point 114 again increasing in cross section through the semi-circular cross section portion 120, there being a partial groove portion 121 at the discharge end of the roll 96, which gradually decreases in depth from the deep portion 119' to the end of said groove.

It will be noted upon reference to Figs. 7 and 8 that the deep portion 113 of the groove 111 will lie opposite and in cooperative relation with the shallow portion 114 of the groove 109 and similarly that the shallow portion 116 of the groove 111 will be in such cooperative relation with the deep portion 119 of the groove 109. This same relationship of the two grooves exists throughout the length thereof so that whether the semi-circular in cross section portions or the portions less or more than semi-circular in cross section are opposite each other, there is always a space defined by the walls of the portions of the grooves that are in cooperative relation with each other that has a circular outline, and of the maximum cross section of the balls that are being made in the machine. The center of the arc defining the cross sectional curvature of the groove does not lie on the parting line of the rolls 96 and 97 except at the time the points 110 and 112, and 115 and 120 are in cooperative relation, these centers being indicated at 125 in Fig. 7.

It is only when the rolls are in the relative position shown in Fig. 7 that these centers 125 are located on said parting line of the rolls 96 and 97. At all other times the centers of the arcs defining the cross sectional curvature of the grooves are offset from this parting line, the maximum distance that these are offset being shown in Fig. 8, in which the centers of curvature of the portions 116 and 119, and 116 and 119' are indicated by the numeral 126, and the centers of curvature of the portions 113 and 114 are indicated by the numeral 127. It will be noted that the centers of curvature 126 and 127 are offset on opposite sides of this parting line between the rolls, and it will be obvious that these centers gradually move as the cooperating portions of the rolls change from the position shown in Fig. 7 to that shown in Fig. 8 from the position on the parting line of the grooves to the maximum position shown at 126 and 127 and back again to the position shown at 125 in Fig. 7, as the rolls continue to rotate.

Figure 9:
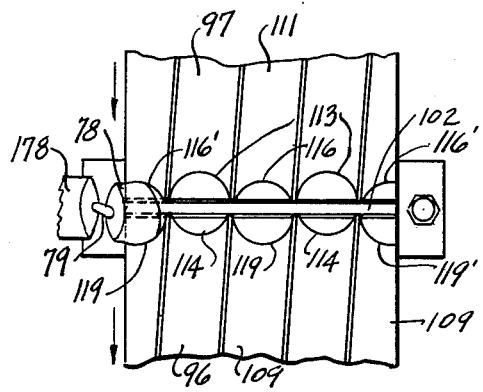
Fig. 9 is a fragmentary diagrammatic elevational view, showing the cooperating separating rolls as the first ball formation of a connected series enters between said rolls.
Figure 10:
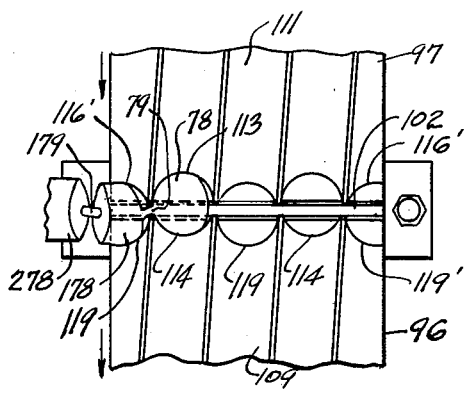
Fig. 10 is a similar view after the rolls have rotated one revolution.

The manner in which the rolls act on the ball formations is shown diagrammatically in Figs. 9 to 13, inclusive. In Fig. 9 a ball formation 78 is shown shortly after it has engaged with the rolls 96 and 97, the ball formation 78 being shown as being in engagement with a deep portion 119 of the groove 109 in the roll 96 and the shallow portion 116' of the groove 111 in the roll 97. In Fig. 10 the same ball formation 78 is shown after the rolls 96 and 97 have rotated one revolution in the direction indicated by the arrows, the ball formation 78 now being in the second turn or convolution of the spiral grooves 109 and 111 and being in engagement with the deep portion 113 of the groove 111 and the shallow portion 114 of the groove 109. The next ball formation 178 is in engagement with the deep portion 119 of the groove 109 and the shallow portion 116' of the groove 111 in the roll 97.

Thus the ball formation 78 will be offset from the ball formation 178 and as a result, shear will be exerted on the narrow connecting neck portion 79 between said ball formations 78 and 178. Not only is this true, but the two ball formations 78 and 178 will be rotating about different axes due to the rolling action produced by the rolls 97 and 96. Due to the difference in distance of the bottom of the groove 113 from the axis of rotation of the roll 97 and the bottom of the groove 114 from the axis of rotation of the roll 96, the tendency will be for the roll 96 to rotate the ball formation 78 at a higher speed than that produced by means of the roll 97. On the other hand, the ball formation 178 will tend to be rotated at a higher speed by the roll 97 than by the roll 96. As long as the ball formations are connected together, as are the formations 78 and 178, this tendency to rotate the ball formations at different speeds will cause some slight slippage between the rolls and the ball formations, which will cause the rolls to exert some forming action on the ball formations, tending to round the same out.

The change in axis of rotation that takes place in the movement of the ball formation 78 from the position shown in Fig. 9 to that shown in Fig. 10 will be gradual as the depth of the grooves changes, and the only time that the axes of rotation of the ball formation 78 and the ball formation 178 will be in alignment will be when the two rolls have the relative position shown in Fig. 7, this position being passed through during the rotation of the rolls midway between the position shown in Fig. 9 and the position shown in Fig. 10. Accordingly there will be torsion exerted on the connecting neck portion 79 throughout the major portion of the time that the ball formation has passed from the position shown in Fig. 9 to that shown in Fig. 10, and both the torsional effect and the shearing effect will be the greatest during this movement of the ball formation 78 when the adjacent ball formation 178 is in the position shown in Fig. 10, or in other words, when both the points of minimum and maximum depth of the grooves in the rolls 96 and 97 are in ball formation engaging position.

Figure 11:
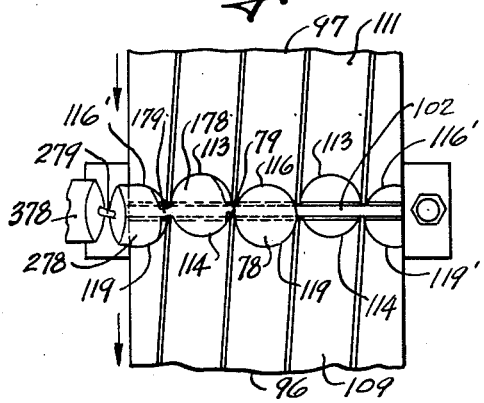
Fig. 11 is a view similar to Fig. 9 after the rolls have rotated another revolution.

In Fig. 11 the ball formation 78 is shown as having advanced one more convolution of the spiral grooves in the rolls 96 and 97, which have of course, rotated one more revolution, the ball formation 78 now being offset in the opposite direction from the ball formation 178 that it was in the position shown in Fig. 10. However, a similar shearing and torsional effect is produced on the narrow neck portion 79 as was true in the previous rotation of the rolls 96 and 97. Another ball formation 278 is now entering between the rolls 96 and 97 and the narrow neck portion 179 between the ball formation 178 and the ball formation 278 is being acted on by the rolls 96 and 97 in the same manner as was the narrow neck portion 79 in the position of the parts shown in Fig. 10.

Figure 12:
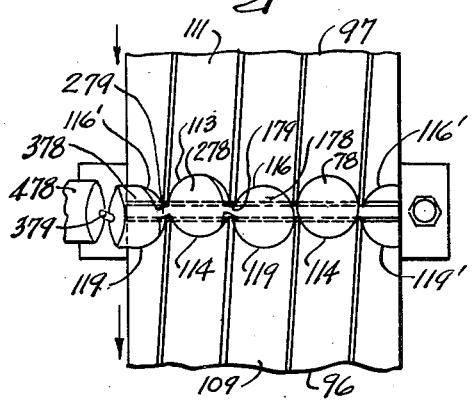
Fig. 12 is a similar view after the rolls have rotated a third revolution.

By the time that the connected ball formations have advanced to the position shown in Fig. 12, the ball formation 78 will have been completely severed from the ball formation 178 and the ball formation 178 will have reached the position that the ball formation 78 had in Fig. 11, the ball formation 278 will have reached the position shown for the ball formation 178 in Fig. 11, and another ball formation 378 connected with the ball formation 278 by the narrow neck portion 279 will be entering between the rolls 96 and 97. The ball formation 78 is rotating between the rolls 96 and 97 in the grooves 109 and 111, and in the position shown in Fig. 12, will be in engagement with the portion of minimum depth 114 of the groove 109 and the portion of maximum depth 113 of the groove 111. As a result the roll 96 will tend to rotate the ball formation 78 at a higher speed than the roll 97, which will cause a shifting of the axis of rotation of the ball formation 78. This shifting takes place as the depth of the grooves 109 and 111 changes, the axis of rotation of the ball 78 continually changing through at least one convolution of the grooves 109 and 111 and finally emerging from between the rolls 96 and 97 with the roll 97 tending to rotate the ball formation at a higher speed than the roll 96. Accordingly the ball formation 78 will have changed its position constantly as it was rolled about between the rolls 96 and 97, after detachment from the next adjacent ball formation 178 so that all portions of the surface of the ball formation 78 will have engaged in the concavely curved grooves 109 and 111. Thus the slight projection that existed when the ball formation 78 was separated from the ball formation 178 will be rolled into the surface of the ball and any slightly cylindrical wall portions thereof will have been rounded out into spherical form by the time said ball formation 78 is ready to be discharged from between the rolls 96 and 97, this position being shown in Fig. 13. Also in Fig. 13 the other ball formations will have advanced one turn in the grooves 109 and 111 and a following ball formation 478 will be entering between the rolls 96 and 97, said ball formation being connected with the ball formation 378 by the narrow neck portion 379 and with the following ball formation 578 by the narrow neck portion 479.

Figure 13:
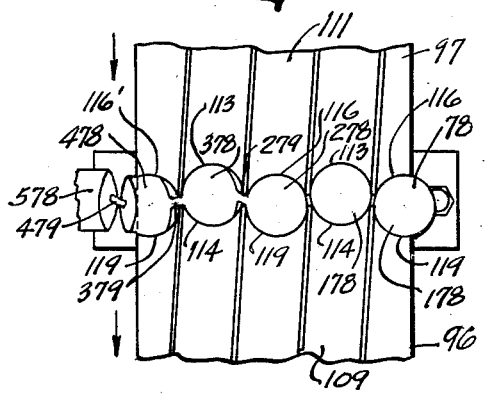
Fig. 13 is a similar view, showing the position of the parts after the ball formation that is shown just entering the rolls in Fig. 9 is completely separated from the next adjacent ball formation and ready to leave the separating mechanism.

Obviously as the connected ball formations 178, 278, 378, 478 and 578 advance toward the right as shown in Fig. 13 due to further rotation of the rolls 96 and 97 these ball formations will be successively separated from each other by shear and torsion on the respective narrow neck portions 179, 279, 379 and 479, and the separated ball formations will successively be rounded, as explained in connection with the ball formation 78, to produce a substantially spherical member when discharged from between the rolls into the trough portion 108 of the discharge tube 106. After a ball formation has been separated from the following ball formations, it might have a tendency to drop down out of the position shown for the ball formation 78 between the rolls 96 and 97. The guides 99 and 102 are provided to prevent any movement of the separated ball formation 78 from a position in which it can be readily discharged from the machine into the discharge tube 106.

It has been found highly desirable to forcibly feed the connected ball formations 78 into the rolls 96 and 97 and to provide means for preventing any whipping about of the connected ball formations 78, should one ball formation be separated from an adjoining ball formation shortly after entering between the rolls 96 and 97, which would cause the rolls 96 and 97 not to have a sufficient holding effect on the string or series of connected ball formations. While it is intended that the ball formations remain connected with each other through the narrow neck portion 79 for a reasonable period of time after entering between the rolls 96 and 97 the combined torsional and shearing effect exerted by said rolls on said narrow neck portions will often cause the ball formations to be separated sooner than illustrated in the diagrammatic showing in Figs. 9 to 13. Suitable brackets 146 are provided on the upper frame portion 83 for mounting the angle members 147 and 148 thereon, said angle members 147 and 148 being preferably secured to the bracket members 146 by welding or in some similar manner.

The angle member 147 is provided with a plurality of bearings for a shaft 149, the upper bearing being shown at 150 in Fig. 2, and a pair of lower bearings at 151 and 152 in Fig. 2. The bearings 151 and 152 are alike and comprise a bar 153 welded to the angle 147 and a pair of members 154 and 155 secured together by means of suitable securing elements 156 and having bearing grooves therein for the shaft 149. Also mounted in fixed position on the shaft 149 to rotate therewith is a grooved guide and feed wheel 157, which is similar to a grooved pulley in shape, having a groove 158 therein.

Mounted on the upper end of the shaft 149 above the bearing 150 in fixed position to rotate therewith, is a pulley 159. A pulley 160 is also provided on the shaft 29 (see Figs. 1 and 2) being mounted thereon above the gear 30 and fixed to said shaft to rotate therewith. The pulleys 159 and 160 are grooved to receive the V-belt 161 that operates over the same, and the size of said pulleys is such that the guide roll 157 will be rotated at such a speed that the peripheral speed thereof will be slightly greater than the linear speed at which the connected ball formations 78 are being discharged from between the rolls 47, or will be carried into the rolls 96 and 97.

Cooperating with the grooved feed roll 157 is a grooved feed roll 162, which is provided with a groove 163, similar to the groove in the guide roll 157. Said pulley is mounted on a stub shaft 164, which is mounted in a pair of bearing blocks 165, one above and one below said pulley, which operate in guide grooves in a pair of guides 166 that are secured to the angle member 148 and to a block 167 secured to the angle member 148 by suitable securing elements 168. A stop plate 169 is mounted between the guide members 166 to halt movement of the shaft 164 toward the shaft 149. Compression coil springs 170 are mounted in recesses or sockets 171 in the block 167 and engage over a lug 172 provided on each slidable bearing block 165 so as to urge the feed roll 162 yieldingly toward the feed roll 157.

It will be noted that the feed rolls 157 and 162 yieldingly clamp the ball formations 78 between the same in the grooves 158 and 163, and that the feed roll 157, which is rotating in the direction indicated by the arrow thereon in Fig. 14, will continuously feed the connected ball formations into the rolls 96 and 97, even should a break occur between the ball formation 78 shown at the upper portion of Fig. 14, which is just entering the rolls, and the ball formation 78 ahead of the same, due to twisting off of the narrow neck portion 79 that had connected this ball formation with a preceding one. Ordinarily, due to the fact that the feed rolls can not be placed any closer than shown in Fig. 1 to the rolls 96 and 97, there will be several ball formations 78 between the feed rolls and the rolls 96 and 97, but these ball formations are held from any whipping about by the feed rolls 157 and 162 and are constantly being urged toward the rolls 96 and 97 even though the ball formation that has just entered the rolls 96 is twisted off the next adjacent one following it. As the ball formations 78 can not enter between the rolls 96 and 97 at as great a linear speed as the peripheral speed of the feed rolls 157 and 162 there will be a tendency of the feed rolls to push the connected ball formations into the rolls 96 and 97, and a slight slippage of the feed rolls relative to the ball formations due to the fact that said rolls have this higher speed.

It is believed that from the above description of the movement of the ball formations between the rolls illustrated in Figs. 9 to 13 the operation of the rolls 96 and 97 in separating the connected ball formations from each other by exerting shear and torsion on the narrow neck portions connecting the same is readily understood. In actual practice it has been found that the narrow neck portions are usually severed even sooner than above described by the action of the rolls 96 and 97.

In operation, a rod 44, which rod may be supplied in coils to the machine and would thus be of considerable length, is fed in a highly heated condition sufficient for forging into the machine, moving from left to right as viewed in Fig. 2, and is acted on by the first set of swaging rolls 36 to form the swages 45, separating the rod 44 into slugs 46 each containing sufficient material to form a ball. Said connected series of slugs 46 then p;ass between the rolls 47 that swage the same at 90° around the rod from the rolls 36 to form the ball formations 78 connected by the narrow neck portions 79. The means for preventing rotation of the swaged rod need not be adjusted to prevent such rotation until the end of a rod or coil of rod 44 is approaching, as the rolls 36 will prevent this as long as these engage the rod.

The connected ball formations then pass between the guide and feed rolls 162 to the rolls 96 and 97. Due to the spiral character of the grooves in the rolls 96 and 97 and the fact that these are of a pitch such that two adjacent grooves will nicely receive the adjacent ball formations, the tendency of the rolls 96 and 97 will be to align the ball formations with the grooves in said rolls, if continuously fed to the same, and advance the connected ball formations to the right at the same rate at which these are being discharged from the rolls 47. The rolls 47 have to be adjusted relative to the rolls 36 so that the swages resulting from the action of the rolls 47 will be in exact longitudinal alignment along the length of the rod 44 with the swages 45 that were formed by the rolls 6, this adjustment being obtained by means of the hand wheel 58. As there are slight variations in diameter of rods, such as the rod 44, this adjustment may be necessary during the time that the machine is operating. The operator can observe whether the rolls 47 are properly located relative to the rolls 36 by the character of the ball formations 78 that come from between the rolls 47.

What I claim is:

1. In the method of making steel balls, hot forming closely spaced spheroidal ball formations connected by short narrow neck portions on a steel rod, and exerting both shear and torsion on a plurality of said narrow neck portions simultaneously while said connected ball formations remain heated to separate said ball formations.

2. In the method of making steel balls, hot forming closely spaced spheroidal ball formations connected by short narrow neck portions on a steel rod and relatively rotating adjacent ball formations on opposite ends of a narrow neck portion about different axes while said connected ball formations remain heated to separate said ball formations.

3. In the method of making steel balls, hot forming closely spaced spheroidal ball formations connected by short narrow neck portions on a steel rod and relatively rotating adjacent ball formations about constantly changing axes while said connected ball formations remain heated to separate said ball formations, and continuing relative rotation of said ball formations about constantly changing axes after separation to round said ball formations into spherical form.

4. In the method of making steel balls, progressively separating closely spaced ball formations connected by short narrow neck portions by exerting both shear and torsion on a plurality of said narrow neck portions simultaneously.

5. In the method of making steel balls, progressively separating closely spaced ball formations connected by short narrow neck portions by simultaneously rotating adjacent ball formations on opposite ends of each of a plurality of said neck portions about different axes.

6. In the method of making steel balls, progressively separating closely spaced ball formations connected by short narrow neck portions by simultaneously rotating adjacent ball formations on opposite ends of each of a plurality of said neck portions about constantly changing axes while advancing said connected ball formations lengthwise of themselves.

7. The method of making steel balls, comprising hot forming uniformly spaced transversely elongated indentations on opposite sides of a steel rod to form a plurality of connected slugs thereon, forming connected ball formations on the indented rod by a rolling swaging action applied to said rod perpendicularly to said first indenting to form a series of closely spaced spheroidal ball formations connected by short narrow neck portions on a steel rod, and exerting both shear and torsion on a plurality of said narrow neck portions simultaneously to progressively sever said connecting portions along the length of said series of formations.

8. In a machine for making steel balls, a pair of swaging rolls rotating about axes perpendicular to the direction of introduction of work to said rolls having uniformly spaced indenting means thereon engaging the work passing between said rolls, a second set of rolls rotating about axes perpendicular to the axes of said first pair of rolls having swaging means thereon spaced similarly to said indenting means, and a third pair of rolls mounted to receive the work discharged from said second set of rolls between the same, said rolls of said third pair being mounted for rotation about axes parallel to the direction of introduction of the said work thereto and each having spiral grooves therein having convolutions that are eccentric to the axis of rotation thereof, adjacent convolutions being radially offset from each other throughout the major portions thereof.

9. In a ball forming machine, a pair of rolls mounted to rotate about parallel axes and to receive work between the same parallel to said axes, said rolls having spiral grooves therein the convolutions of which are eccentric to the axis of rotation thereof, adjacent convolutions being offset from each other, and means for rotating said rolls to maintain a predetermined relationship between the grooves thereof.

10. In a ball forming machine, a pair of rolls mounted to rotate about parallel axes and to receive work between the same parallel to said axes, each of said rolls having spiral transversely concave grooves therein that vary uniformly in depth between shallow and deep portions in each convolution thereof, and means for driving said pair of rolls so that a deep groove portion of one roll is in work engaging position when a shallow portion of a cooperating groove of the other roll is in work engaging position and vice versa.

11. In a ball forming machine, a pair of rolls mounted to rotate about parallel axes and to receive work between the same parallel to said axes, each of said rolls having grooves therein that are axially adjacent and have corresponding portions of adjacent grooves of varying depth to provide portions on said rolls simultaneously engaging longitudinally adjacent portions of the work received between the same that are alternately deep and shallow, with the deep portions of one roll opposite the shallow portions of the other roll in engagement with the work.

12. In a ball forming machine, a pair of rolls mounted to rotate about parallel axes and to receive work between the same parallel to said axes, said rolls having spiral grooves therein that gradually alternately decrease and increase in depth between uniformly spaced points of maximum and minimum depth throughout the length of said grooves, and means for rotating said rolls to maintain complemental portions of said grooves in opposed relationship.

13. In a ball forming machine, a pair of rolls mounted to rotate about parallel axes and to receive work between the same parallel to said axes, said rolls having spiral grooves therein that gradually alternately decrease and increase in depth between uniformly spaced points of maximum and minimum depth throughout the length of said grooves, the axially adjacent portions of said grooves being offset, and means for driving said pair of rolls so that a maximum depth groove portion of one roll is in work engaging position when a minimum depth portion of a cooperating groove of the other roll is in work engaging position and vice versa.

14. In a machine for making steel balls, a pair of swaging rolls rotating about axes perpendicular to the direction of introduction of work to said rolls, a second set of swaging rolls rotating about axes perpendicular to the axes of the first pair of rolls and to said direction, and means for holding said work against rotation about its longitudinal axis between said first pair of swaging rolls and said second set of swaging rolls, comprising guiding means having a passage oblong in cross section.

15. In a machine for making steel balls, a pair of swaging rolls rotating about axes perpendicular to the direction of introduction of work to said rolls, a second set of swaging rolls rotating about axes perpendicular to the axes of the first pair of rolls and to said direction, and means for holding said work against rotation about its longitudinal axes between said first pair of swaging rolls and said second set of swaging rolls, comprising guiding means having a passage oblong in cross section and means for adjusting the cross section of said guiding means.

16. In a ball forming machine, a pair of rolls mounted to rotate about parallel axes lying in an inclined plane and to receive work between the same parallel to said axes, said rolls having spiral grooves therein the convolutions of which are eccentric to the axis of rotation thereof, adjacent convolutions being offset from each other, and means for rotating said rolls to maintain a predetermined relationship between the grooves thereof.

References Cited in the file of this patent

UNITED STATES PATENTS

| Number | Name | Date |
|---|---|---|
| 1,890,693 | Munro | Dec. 13, 1932 |
| 2,048,917 | Brandt | July 28, 1936 |
| 2,269,899 | Brandt | Jan. 13, 1942 |

FOREIGN PATENTS

| 443,418 | Great Britain | Feb. 27, 1936 |